(12) United States Patent
Fang

(10) Patent No.: US 12,061,761 B2
(45) Date of Patent: Aug. 13, 2024

(54) TOUCH PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Liang Fang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/286,462

(22) PCT Filed: Mar. 26, 2021

(86) PCT No.: PCT/CN2021/083366
§ 371 (c)(1),
(2) Date: Apr. 17, 2021

(87) PCT Pub. No.: WO2022/188210
PCT Pub. Date: Sep. 15, 2022

(65) Prior Publication Data
US 2024/0012512 A1   Jan. 11, 2024

(30) Foreign Application Priority Data

Mar. 12, 2021   (CN) .......................... 202110268592.5

(51) Int. Cl.
*G06F 3/041*   (2006.01)
*G06F 3/044*   (2006.01)

(52) U.S. Cl.
CPC ........ *G06F 3/0418* (2013.01); *G06F 3/04164* (2019.05); *G06F 3/04166* (2019.05); *G06F 3/0443* (2019.05)

(58) Field of Classification Search
CPC ............... G06F 3/0418; G06F 3/04166; G06F 3/04164; G06F 3/0443
(Continued)

(56) References Cited

U.S. PATENT DOCUMENTS

2015/0301639 A1* 10/2015 Shin ...................... G06F 3/0446
345/173
2017/0192557 A1* 7/2017 Xiong ................... G06F 3/0446
(Continued)

FOREIGN PATENT DOCUMENTS

CN   104765501 A   7/2015
CN   104777955 A   7/2015
(Continued)

OTHER PUBLICATIONS

Wei Danping et al. Array substrate, display panel and driving method thereof, and display device Feb. 8, 2017 Applicant(s): Xiamen Tianma Micro Electronics Co Ltd; CN106383624 (A) Figure 1, paras 2-6, English.*
(Continued)

*Primary Examiner* — Prabodh M Dharia
(74) *Attorney, Agent, or Firm* — PV IP PC; Wei Te Chung; Zhigang Ma

(57) ABSTRACT

The present application provides a backlight module and a display device. The backlight module includes: a metal layer including signal lines and first signal connection lines extending along a first direction in the same layer; and light-emitting control structures. One signal line is disposed at each of at least one side of each column of the light-emitting control structures, each light-emitting control struc-
(Continued)

ture is connected to the corresponding signal line, and any two adjacent ones of the light-emitting control structures in each column of the light-emitting control structures are connected through one first signal connection line.

20 Claims, 6 Drawing Sheets

(58) Field of Classification Search
USPC .................................................. 345/173, 174
See application file for complete search history.

(56) References Cited

U.S. PATENT DOCUMENTS

| | | | |
|---|---|---|---|
| 2018/0032191 A1* | 2/2018 | Xiao | G06F 3/0412 |
| 2020/0012379 A1 | 1/2020 | Hong et al. | |
| 2020/0110483 A1* | 4/2020 | Lee | G06F 3/0443 |
| 2022/0147185 A1* | 5/2022 | Kim | G06F 3/046 |

FOREIGN PATENT DOCUMENTS

| CN | 104932134 A | 9/2015 |
|---|---|---|
| CN | 105843454 A | 8/2016 |
| CN | 106383624 A | 2/2017 |
| CN | 106951119 A | 7/2017 |
| CN | 107422902 A | 12/2017 |
| CN | 110187789 A | 8/2019 |
| CN | 112181197 A | 1/2021 |

OTHER PUBLICATIONS

Wei Danping et al. Array substrate, display panel and driving method thereof, and display device Feb. 8, 2017 Applicant(s): Xiamen Tianma Micro Electronics Co Ltd; CN106383624 (A) Figure 1, paras 2-6, Chinese.*
Chinese Office Action issued in corresponding Chinese Patent Application No. 202110268592.5 dated Mar. 11, 2022, pp. 1-7.
International Search Report in International application No. PCT/CN2021/083366, mailed on Dec. 15, 2021.
Written Opinion of the International Searching Authority in International application No. PCT/CN2021/083366, mailed on Dec. 15, 2021.

* cited by examiner

TOUCH PANEL AND DISPLAY DEVICE

RELATED APPLICATIONS

This application is a National Phase of PCT Patent Application No. PCT/CN2021/083366 having international filing date of Mar. 26, 2021, which claims the benefit of priority of Chinese Patent Application Nos. 202110268592.5 filed on Mar. 12, 2021. The contents of the above applications are all incorporated by reference as if fully set forth herein in their entirety.

1. FIELD OF DISCLOSURE

The present application relates to a field of touch technology and in particular, to a touch panel and a display device.

2. DESCRIPTION OF RELATED ART

Generally speaking, a touch function has become one of the standard configurations for most display devices. Capacitive touch panels are widely used. The basic principle is to use a finger or a stylus to generate capacitance with the touch screen, and electrical signals formed by a capacitance change before and after touch are used to confirm whether a touch panel is touched and to obtain touch coordinates.

An important touch technology of the capacitive touch panels is a self-capacitive touch technique. A common touch pattern design is shown in FIG. 1. An output end of a touch integrated circuit 4 is connected to an input end of a multiplexing (MUX) circuit 3. An output end of the multiplexing circuit 3 is connected to a corresponding one of touch signal lines 2, and the touch signal lines 2 are correspondingly connected to touch sensing blocks 1.

A structure of the multiplexing circuit 3 in FIG. 1 is shown in FIG. 2. Each output end of the touch integrated circuit 4 outputs a touch driving signal which is, for example, a touch driving signal S1 or a touch driving signal S2. Each touch driving signal is connected to a corresponding multiplexing unit in the multiplexing circuit 3. Each unused multiplexing unit comprises multiple transistors, and a switch signal is connected to a gate of the corresponding transistor. For example, a switch signal T1 is connected to the gate of one transistor of one multiplexing unit and to the gate of one transistor of another multiplexing unit. Similarly, a switch signal T2, a switch signal T3, a switch signal T4, and a switch signal T5 have a connection configuration like that of the switch signal T1. The only difference is that each switch signal controls different transistors in the multiplexing circuit 3.

FIG. 3 shows a timing sequence of the switch signal T1, the switch signal T2, the switch signal T3, the switch signal T4, and the switch signal T5. Each switch signal works in a time-sharing manner. The working cycles of the switch signals are independent of each other on a time axis, and the working cycles of the switch signals T1, the switch signal T2, the switch signal T3, the switch signal T4, and the switch signal T5 rotate in sequence.

However, the above configuration results in a parasitic capacitance generated between the touch signal line 2 and the touch sensing block 1. Due to a small structural distance between the touch signal line 2 and the touch sensing block 1, the parasitic capacitance is large. Moreover, especially at a far end (an end far away from the touch integrated circuit 4), an even greater capacitive reactance is generated, thus easily causing failures in driving a touch function or leading to an increase in power consumption for a touch function, which affects touch performance.

It should be noted that the above description of the background technology is only provided for ease of a clear and thorough understanding of the technical solutions of the present application. Therefore, the above-mentioned technical solutions involved cannot be considered well-known to those skilled in the art just because they appear in the background of the present application.

SUMMARY

The present application provides a touch panel and a display device, which alleviate a problem that a large parasitic capacitance in a self-capacitive touch panel causes increased power consumption of the touch function and/or leads to failures to drive the touch function.

In one aspect, the present application provides a touch panel, comprising:

a plurality of touch electrode columns, wherein each of the touch electrode columns comprises a plurality of touch electrodes arranged along a first direction;

a plurality of touch line groups, wherein each of the touch line groups comprises a plurality of touch lines, and the plurality of touch lines of a same touch line group are electrically connected to the plurality of touch electrodes in a same touch electrode column; and a plurality of multiplexing circuits, wherein each of the multiplexing circuits comprises a plurality of multiplexing units, output ends of a same multiplexing unit are correspondingly connected to the plurality of touch lines in the same touch line group, and a plurality of output channels of the same multiplexing unit are turned on or turned off synchronously.

In some embodiments, each of the plurality of multiplexing circuits comprises a control sub-circuit, and the control sub-circuit is electrically connected to the plurality of multiplexing units to control two adjacent ones of the touch electrode columns to operate in a time-sharing manner.

In some embodiments, the plurality of touch electrode columns are sequentially arranged along a second direction, and the second direction is different from the first direction; the i-th touch electrode column operates simultaneously with the (i+2)-th touch electrode column, and/or the (i+1)-th touch electrode column operates simultaneously with the (i+3)-th touch electrode column; and wherein i is a positive integer.

In some embodiments, a number of the plurality of touch electrodes in the same touch electrode column is equal to a number of the plurality of touch lines in the same touch line group, and each one of the plurality of touch electrodes is connected to one of the plurality of touch lines.

In some embodiments, the touch panel further comprises a touch integrated circuit; each of the plurality of multiplexing units comprises at least two thin film transistors; and two output pins of the touch integrated circuit are respectively electrically connected to input ends of two of the thin film transistors; a same control signal output by the control sub-circuit is electrically connected to control ends of the two thin film transistors; output ends of the two thin film transistors are respectively electrically connected to different touch electrodes in the same touch electrode column; a number of the thin film transistors in the same multiplexing unit is equal to the number of the plurality of touch lines in the same touch line group; and the output end of each of the thin film transistors is connected to one of the touch lines.

In some embodiments, the touch panel further comprises a plurality of touch driving line groups; a number of touch driving lines in a same touch driving line group is equal to a number of thin film transistors in the same multiplexing unit; and each of the touch driving lines is connected to an input end of one of the thin film transistors.

In some embodiments, the touch integrated circuit comprises a plurality of touch output channel groups; a number of touch output channels in a same touch output channel group is equal to a number of touch driving lines in the same touch driving line group; and each of the touch output channels is connected to one of the touch driving lines.

In some embodiments, each of the touch output channel groups is simultaneously connected to multiple ones of the touch driving line groups that are not adjacent to each other.

In some embodiments, each of the control sub-circuits comprises a switch line; the touch panel further comprises a connection portion arranged between two adjacent ones of the multiplexing circuits; and the switch line in one of the multiplexing circuits is electrically connected to the switch line in another one of the multiplexing circuits through the connection portion.

In some embodiments, the connection portion comprises at least one connection line; and the switch lines of two different ones of the multiplexing circuits are connected by a same connection line to synchronously drive at least two of the touch electrode columns connected to the two different multiplexing circuits.

In another aspect, the present application provides a display device, comprising:

a plurality of touch electrode columns, wherein each of the touch electrode columns comprises a plurality of touch electrodes arranged along a first direction;

a plurality of touch line groups, wherein each of the touch line groups comprises a plurality of touch lines, and the plurality of touch lines of the same touch line group are electrically connected to the plurality of touch electrodes in the same touch electrode column;

a plurality of multiplexing circuits, wherein each of the multiplexing circuits comprises a plurality of multiplexing units, output ends of a same multiplexing unit are correspondingly connected to the plurality of touch lines in the same touch line group, and a plurality of output channels of the same multiplexing unit are turned on or turned off synchronously; and a touch integrated circuit, wherein the touch integrated circuit comprises a plurality of touch output channel groups, and each of the touch output channel groups is electrically connected to input ends of at least two of the multiplexing units.

The touch panel and display device provided by the present application can enable the same touch electrode column to operate in a synchronous driving mode by using the same multiplexing unit to turn on or turn off synchronously. The touch line group and the corresponding touch electrode column have the same driving signal, thus reducing or eliminating, not only a parasitic capacitance between the touch line and the touch electrode connected to the touch line, but also parasitic capacitances between the touch line and other touch electrodes in the same column. Accordingly, the present application reduces the power consumption for a touch function, and avoiding failures in driving the touch function.

BRIEF DESCRIPTION OF DRAWINGS

The present application is described in detail below in conjunction with the accompanying drawings for ease of understanding the technical solutions and other beneficial effects of the present application.

DETAILED DESCRIPTION OF EMBODIMENTS

In order to make the purpose, technical solutions, and effects of the present application clearer and more definite, the following further describes the present application in detail with reference to the accompanying drawings and examples. It should be understood that the specific embodiments described here are only used to explain the present application, and are not used to limit the present application.

Figure 1:
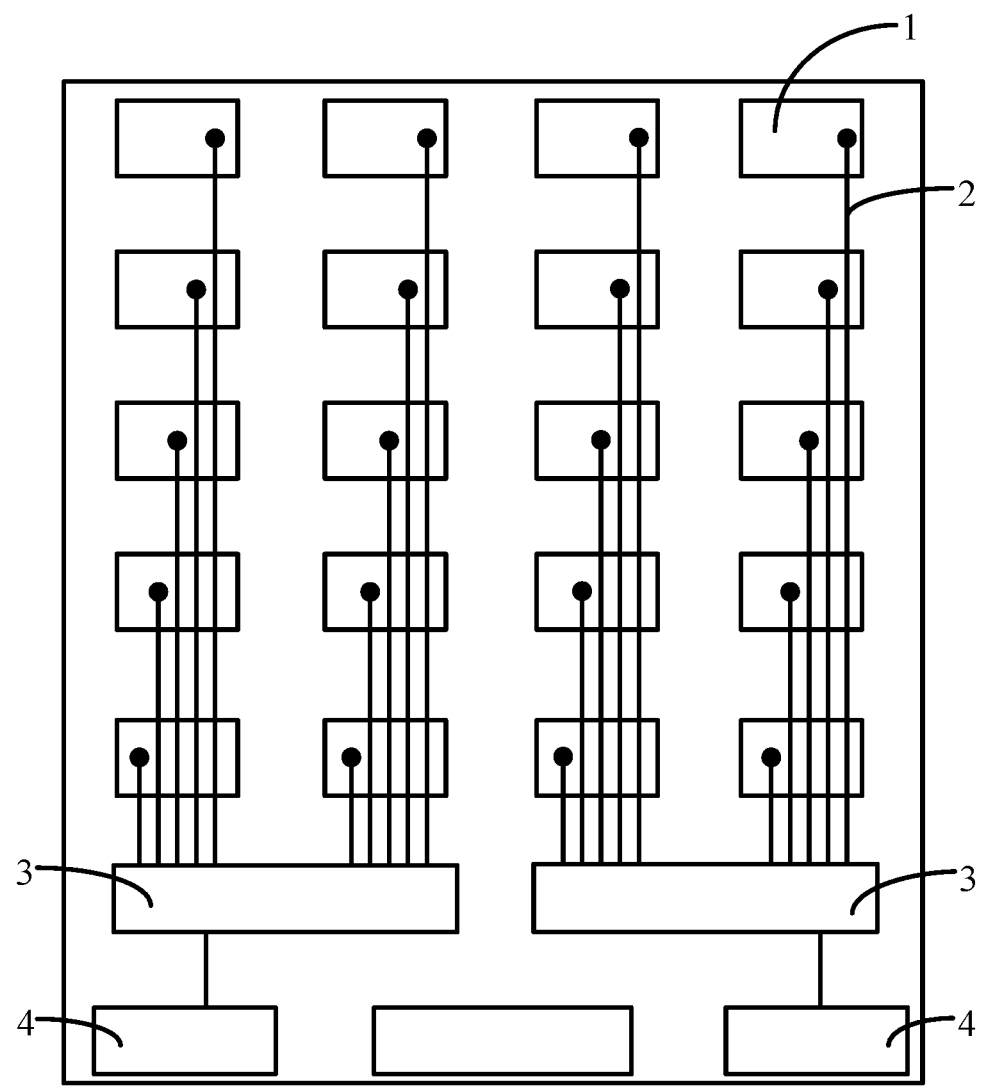
FIG. 1 is a schematic structural view illustrating a conventional touch panel.
Figure 2:
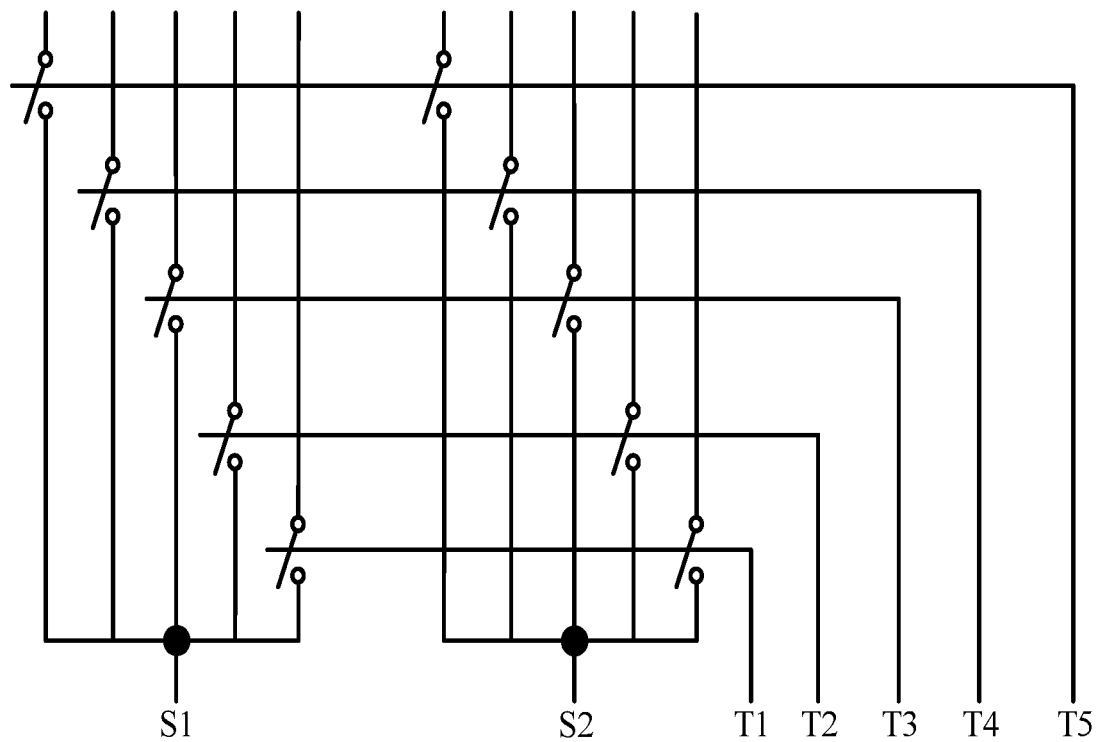
FIG. 2 is a schematic structural view illustrating a multiplexing circuit in FIG. 1.
Figure 3:
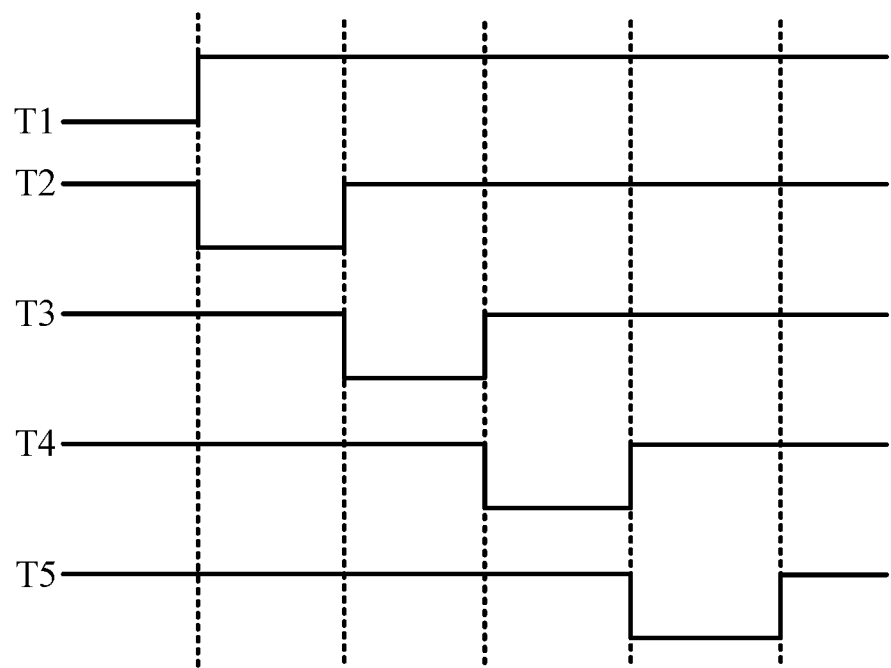
FIG. 3 is a timing sequence diagram of the multiplexing circuit in FIG. 2.
Figure 4:
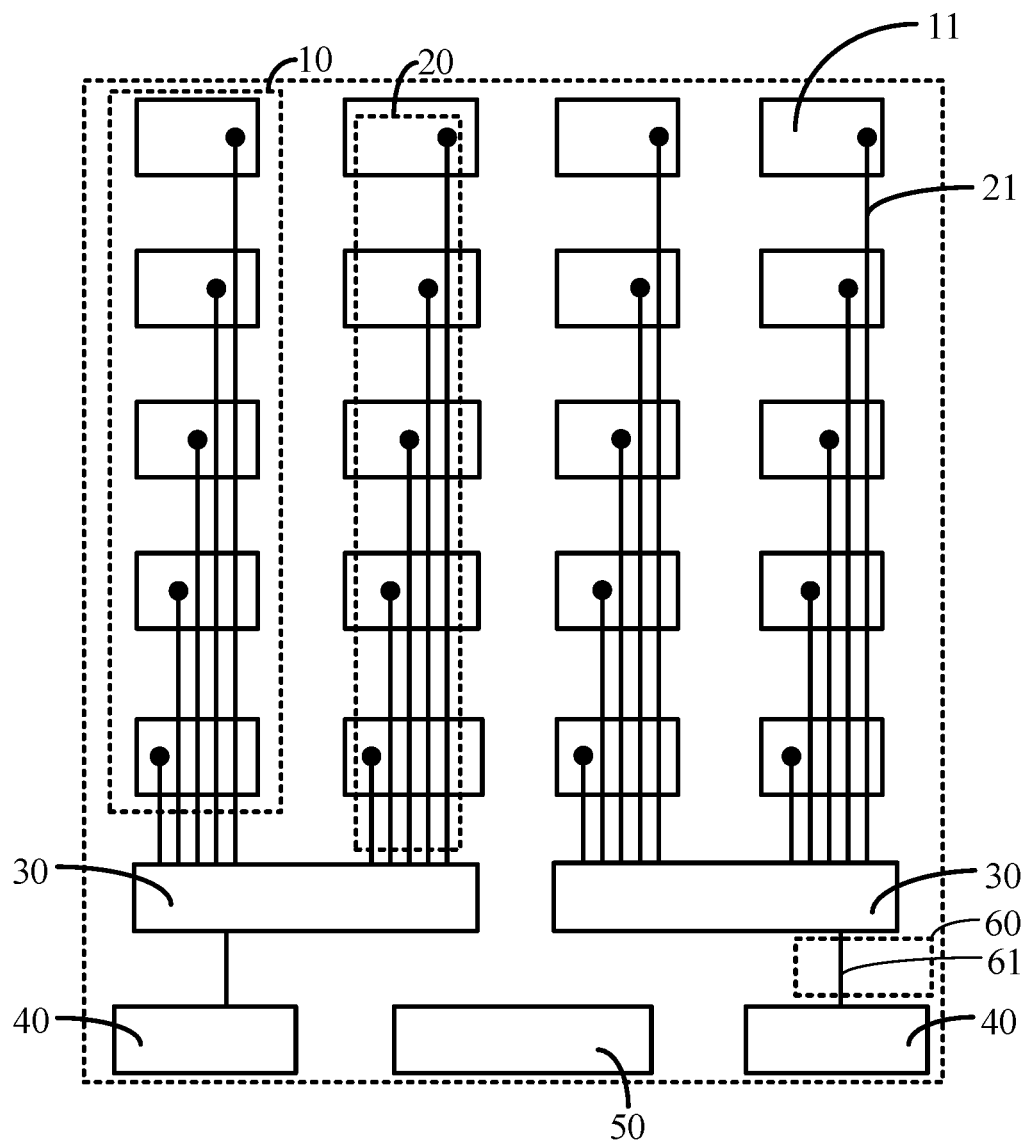
FIG. 4 is a schematic structural view of a touch panel according to one embodiment of the present application.

Please refer to FIGS. 4 to 9. As shown in FIG. 4, the present embodiment provides a touch panel. The touch panel comprises a plurality of touch electrode columns 10, a plurality of touch line groups 20, a plurality of multiplexing circuits 30, and a plurality of switch lines. The same touch line group 20 is correspondingly connected to the same touch electrode column 10. The multiplexing circuit 30 comprises a plurality of multiplexing units 31, and an output end of the same multiplexing unit 31 is correspondingly connected to the same touch line group 20. Output channels of the same multiplexing unit 31 are turned on or turned off synchronously.

The output channels of the same multiplexing unit 31 are turned on or turned off synchronously, which can be realized by, but not limited to, connecting the same switch line to a control end of at least one multiplexing unit 31. Alternatively, the output channels of the same multiplexing unit 31 can be turned on or turned off synchronously by connecting different switch lines to the control end of the multiplexing unit 31 and introducing the same switch signal. It should be noted that one output channel of the multiplexing unit 31 can be a transmission channel between a source and a drain of a thin film transistor in the multiplexing unit 31, and turning on and off the transmission channel is controlled by a gate of the thin film transistor.

The multiplexing circuit can comprise a control sub-circuit, the control sub-circuit is configured to generate and output multiple switch control signals, the control sub-circuit can also comprise the switch line, and the switch line is configured to correspondingly transmit the switch control signals to the gate of the thin film transistor of the multiplexing unit 31.

The gates of one or more thin film transistors in the same multiplexing unit 31 are connected to the same switch line. When one or more thin film transistors in the same multiplexing unit 31 are turned on or switched on at the same time, it means synchronous turn-on. When one or more thin film transistors in the same multiplexing unit 31 are turned off at the same time or are not turned on at the same time, it means synchronous turn-off.

The touch panel is provided with touch electrodes 11 arranged in an array, wherein the touch electrode column 10 in this example can be any column of the touch electrodes 11, and a shape of the touch electrode 11 is not specifically limited. A shape of the touch electrode 11 can be, but not limited to, a rectangle, a square, a circle, an ellipse, or other irregular shape. The touch electrode column 10 can include one or more touch electrodes 11.

It should be noted that the same switch line in the present embodiment can be connected to one or more multiplexing units 31. When the corresponding switch signal is received by the switch line, the corresponding one or more multiplexing units 31 are turned on or off synchronously, so that the inventive concept of the present application can also be realized. When the same switch line controls multiple multiplexing units 31 to turn on or turn off synchronously, the number of switch lines is reduced, and a border/bezel space of the touch panel is saved.

It should be noted that the multiplexing circuit 30 is used as a touch driving circuit of the present embodiment, which can reduce the number of signal lines at an input side of the multiplexing circuit 30 and reduce a space occupied by the signal lines at the input side in the touch panel.

The touch panel provided by the present embodiment can enable the same touch electrode column 10 to operate in a synchronous driving mode by using the same multiplexing unit 31 to turn on or turn off synchronously. The touch line group 20 and the corresponding touch electrode column 10 have the same driving signal, which can reduce or eliminate not only a parasitic capacitance between the touch line and the touch electrode connected to the touch line but also parasitic capacitances between the touch line and other touch electrodes in the same column. Accordingly, the present application reduces the power consumption for a touch function, and avoids failures in driving the touch function.

It should be noted that when the touch line group 20 and the corresponding touch electrode column 10 have the same driving signal, it means that the two have the same or similar potential. According to working principles of a capacitor, it can be known that a parasitic capacitance between the touch line group 20 and the corresponding touch electrode column 10 can be a minimum value, and can even be reduced to a negligible value.

In one embodiment, the touch electrode column 10 and the touch line group 20 can be located at, but are not limited to, two film layers that are not adjacent to each other. For example, a first film layer can be provided with one or more touch electrode columns 10, and a second film layer can be provided with one or more touch line groups 20. At least one insulating layer is provided between the first film layer and the second film layer, so that the first film layer and the second film layer are electrically insulated to avoid unnecessary connection relationship therebetween. A connection between the touch electrode column 10 and the corresponding touch line group 20 can be achieved through one or more corresponding via holes. Accordingly, since the touch electrode column 10 and the touch line group 20 in this embodiment are connected through the via holes, the touch electrode column 10 and the corresponding touch line group 20 at least partially overlap each other. As a result, there is no need to reserve a layout space for arranging the touch line group between the adjacent touch electrode columns 10, which can increase a high-density distribution of the touch electrode columns 10, and even can enable the present application to have no blind zones for touch control and further improve the touch performance.

In one embodiment, the touch electrode columns 10 and the touch line groups 20 can also be located in the same film layer. For example, the touch line groups 20 are located at one side of the touch electrode columns 10, and the connection between the touch electrode column and the corresponding touch line group 20 can be achieved through the corresponding touch line. In the present embodiment, the same touch electrode column 10 can operate in the synchronous driving mode by connecting the same switch line at least to the control end of the same multiplexing unit 31. The touch line group 20 and the corresponding touch electrode column 10 have the same driving signal, thereby reducing or eliminating the parasitic capacitances between the touch line group 20 and the touch electrode column 10, reducing the power consumption for touch control, and avoiding failures in touch operations.

In the present application, the multiplexing unit 31 can comprise multiple thin film transistors 311. Gates of these thin film transistors 311 in the same multiplexing unit 31 can be collectively referred to as the control end of the multiplexing unit 31. It should be noted that the gates of these thin film transistors 311 in the same multiplexing unit 31 are connected to the same switch line, which can reduce the number of switch lines in the touch panel and shorten a distance between two adjacent touch electrodes columns 10, increase the distribution density of the touch electrode columns 10, and thereby facilitate eliminating blind zones for touch control operations of the touch panel.

In one embodiment, the touch electrode column 10 can comprise one or more touch electrodes 11. The touch line group 20 can comprise one or more touch lines 21. The number of the touch electrodes 11 in the same touch electrode column 10 can be, but not limited to, equal to the number of the touch lines 21 in the same touch line group 20. Alternatively, the number of the touch lines 21 in the same touch line group 20 is greater than the number of the touch electrodes 11 in the same touch electrode column 10, and therefore, such a configuration provides a spare touch line 21. Accordingly, in the case of damage such as breakage of the touch line 21 when a product is in use, the product can be quickly repaired by replacing the touch line 21. Each of the touch electrodes 11 is correspondingly connected to at least one touch line 21. This embodiment can reduce the number of film layers used in the touch panel, so a thickness of the touch panel can be reduced, and a manufacturing process is simplified.

Figure 5:
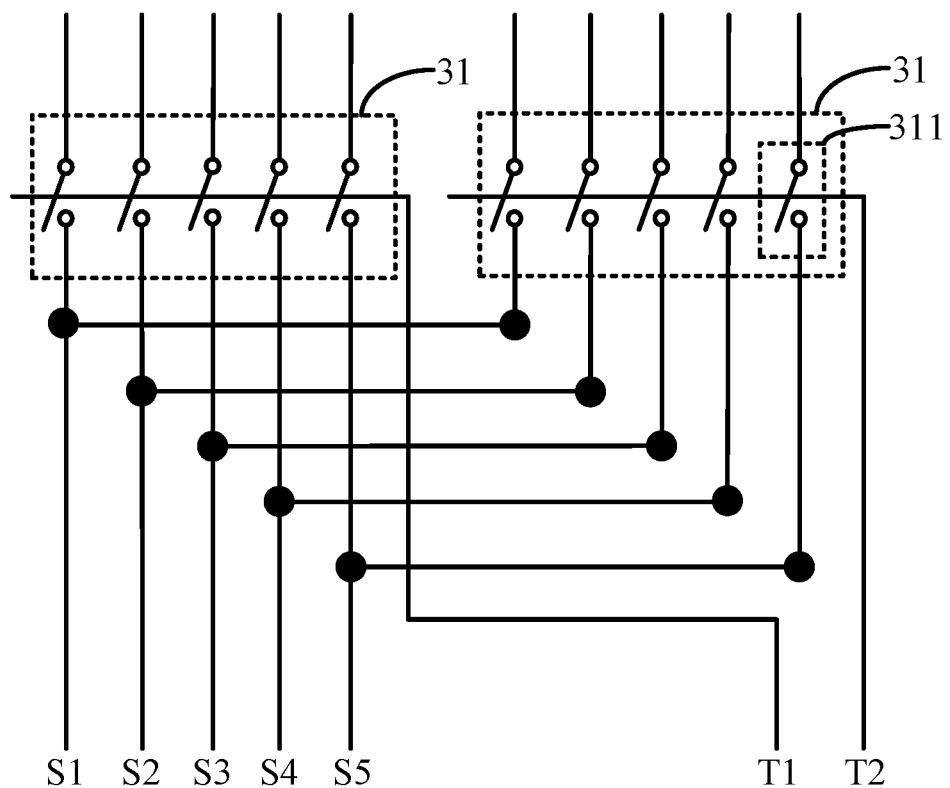
FIG. 5 is a schematic structural view of a multiplexing circuit in FIG. 4.

In one embodiment, as shown in FIGS. 4 and 5, the multiplexing circuit 30 comprises one or more multiplexing units 31. The multiplexing unit 31 comprises one or more thin film transistors 311. The number of the thin film transistors 311 in the same multiplexing unit 31 can be, but is not limited to, equal to the number of the touch lines 21 in the same touch line group. Alternatively, the number of the thin film transistors 311 in the same multiplexing unit 31 is greater than the number of the touch lines 21 in the same touch line group 20, and therefore, such a configuration provides a spare thin film transistor 311. If the thin film transistor 311 is damaged and needs to be repaired when a product is in use, the product can be quickly repaired by replacing the thin film transistor 311. Each of the touch electrodes 11 is correspondingly connected to at least one touch line 21. An output end of each thin film transistor 311 is connected to one touch line 21.

In the present embodiment, the thin film transistor 311 can be, but is not limited to, an N-channel thin film transistor; and the thin film transistor 311 can also be a P-channel thin film transistor. The output end of the thin film transistor 311 in the present embodiment can be one of the source or the drain of the thin film transistor.

In one embodiment, the touch panel further comprises a touch driving line group 60. The touch driving line group 60 can comprise one or more touch driving lines 61. The number of the touch driving lines 61 in the same touch driving line group 60 can be, but not limited to, equal to the number of the thin film transistors 311 in the same multiplexing unit 31. Alternatively, the number of the touch driving lines 61 in the same touch driving line group 60 is greater than the number of the thin film transistors 311 in the same multiplexing unit 31, and therefore, such a configuration provides a spare touch driving line 61. Accordingly, if the touch driving line 61 is damaged and needs to be repaired when a product is in use, the product can be quickly repaired by replacing the touch driving line 61. Each touch driving line 61 is connected to an input end of one thin film transistor 311.

The input end of the thin film transistor 311 in the present embodiment can be the other one of the source or the drain of the thin film transistor 311.

Figure 8:
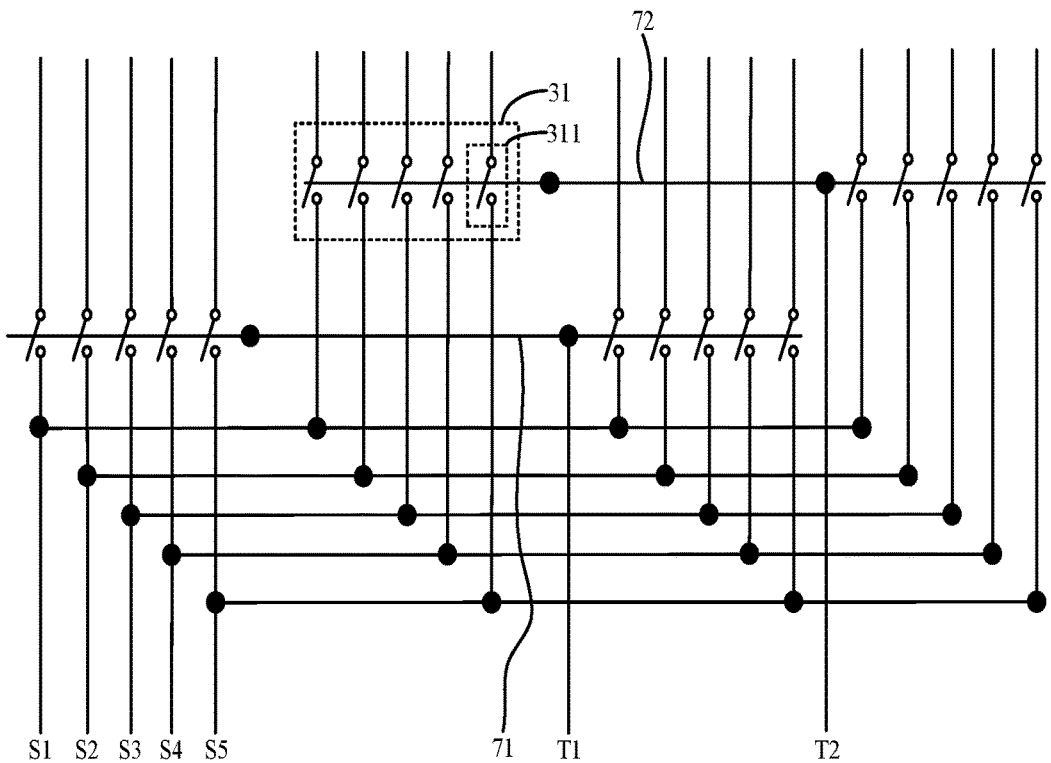
FIG. 8 is a schematic structural view of the multiplexing circuit in FIG. 7.

In one embodiment, the touch panel further comprises a touch integrated circuit 40. The touch integrated circuit 40 comprises one or more touch output channel groups. The touch output channel group comprises one or more touch output channels. The number of the touch output channels in the same touch output channel group is equal to the number of the touch driving lines 61 in the same touch driving line group 60. Each of the touch output channels is connected to one touch driving line 61. For example, as shown in FIG. 5 or FIG. 8, the touch output channel can be any one of a touch output channel S1, a touch output channel S2, a touch output channel S3, a touch output channel S4, or the touch output channel S5. The touch output channels in the same touch output channel group are connected to different touch driving lines 61. Each touch output channel is configured to output a corresponding touch driving signal.

It should be noted that the touch output channel S1, the touch output channel S2, the touch output channel S3, the touch output channel S4, and the touch output channel S5 in the same touch output channel group can output the same electrical signal or the same touch driving signal.

In one embodiment, the touch panel further comprises a display integrated circuit 50. The display integrated circuit 50 is located between two adjacent touch integrated circuits 40.

As shown in FIGS. 4 and 5, in combination with at least one of the foregoing embodiments, the touch output channels in the same touch output channel group output different touch driving signals to the corresponding respective touch electrode columns 10. The same switch signal T1 or the same switch signal T2 is used to control different multiplexing units 31 at the same time, so as to realize that the touch electrode column 10 and the corresponding touch line group 20 have driving signals at the same potential at the same time, thus reducing or eliminating a parasitic capacitance between the touch electrode column 10 and the corresponding touch line group 20.

Figure 6:
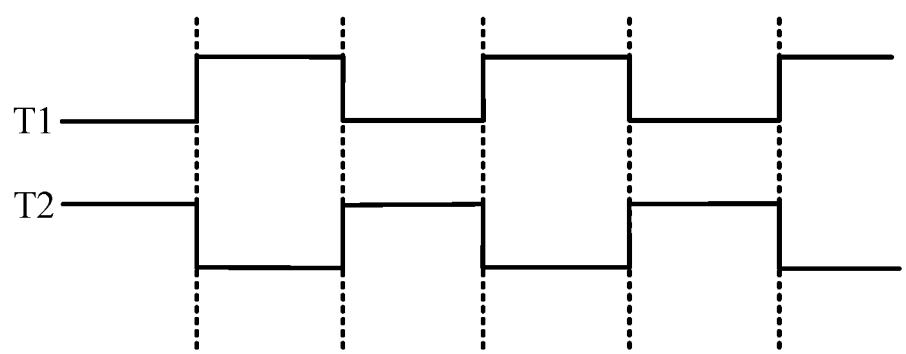
FIG. 6 is a timing sequence diagram of the multiplexing circuit in FIG. 5.

As shown in FIGS. 5 and 6, when the thin film transistor 311 in the multiplexing unit 31 is a P-channel thin film transistor 311, working cycles of the switching signal T1 and the switching signal T2 are independent of each other and do not overlap each other. For example, when the switch signal T1 is at a low potential, the corresponding touch electrode column and the corresponding touch line group both have touch driving signals at high potential; and at the same time, the switching signal T2 is at high potential, and the corresponding another touch electrode column and the corresponding another touch line group both have touch driving signals at low potential. Alternatively, when the switch signal T1 is at high potential, the corresponding touch electrode column and the corresponding touch line group both have touch driving signals at low potential; and at the same time, the switch signal T2 is at low potential, the corresponding another touch electrode column and the corresponding another touch line group both have touch driving signals at high potential.

Figure 7:
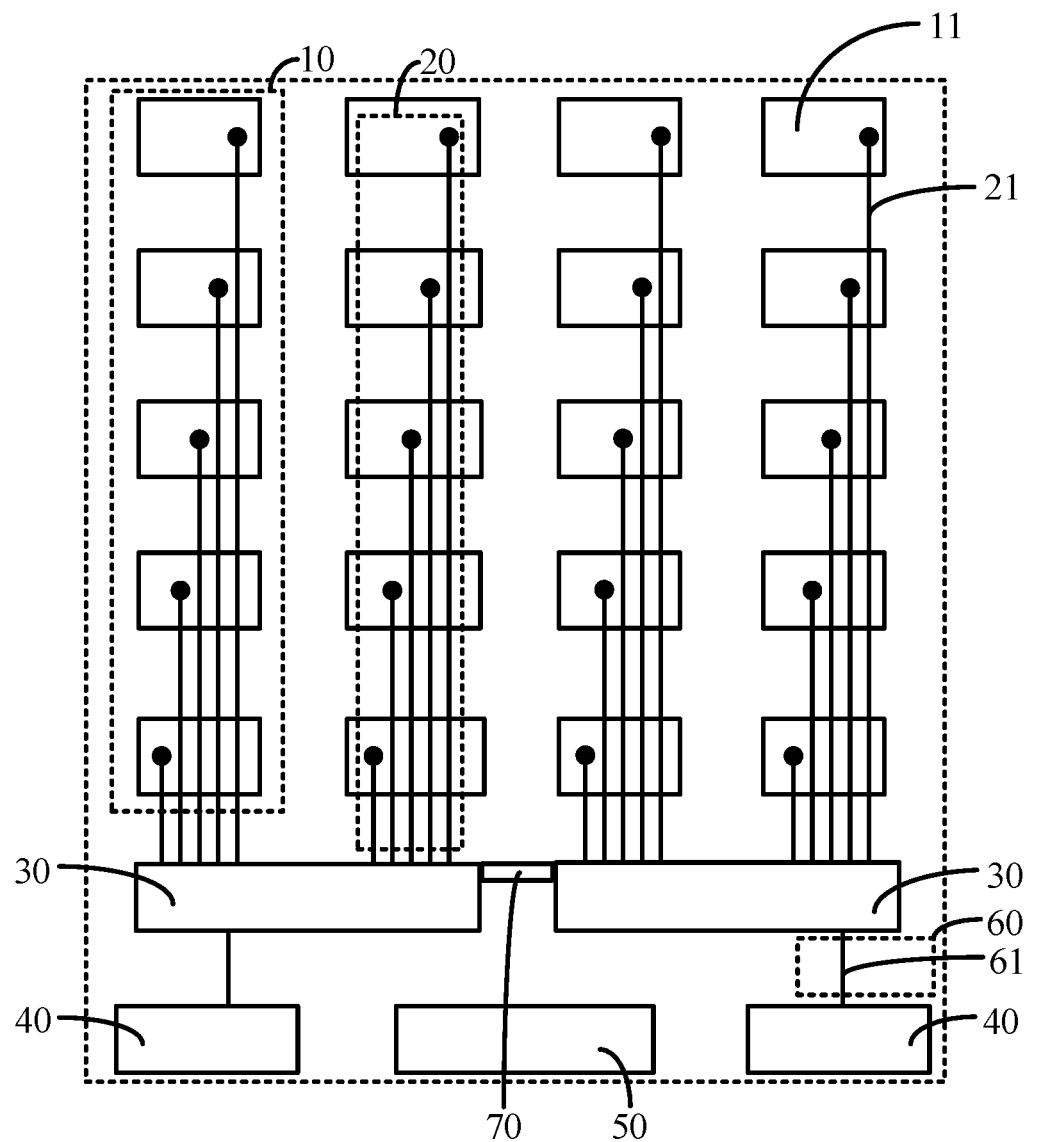
FIG. 7 is another schematic structural view illustrating the touch panel according to one embodiment of the present application.

As shown in FIGS. 7 and 8, in one embodiment, the touch panel comprises at least two multiplexing circuits 30 and a connection portion 70 arranged between two adjacent multiplexing circuits 30. Different multiplexing circuits 30 are arranged in a same rectangular area and are located in different positions in the same rectangular area. There is a certain space between the two multiplexing circuits 30, and the connection portion 70 can be arranged in the space. For example, the connection portion 70 can be arranged in, but not limited to, an upper portion of the space, a middle portion of the space, or a lower portion of the space. Two different switch lines are connected by the connection portion 70. The arrangement of the connection portion 70 can reduce the number of the switch lines and saves a space occupied in the touch panel.

In one embodiment, the connection portion 70 can comprise one or more connection lines 71. The connection line 71 is connected to two corresponding switch lines; however, the present application is not limited in this regard. Specifically, two non-adjacent switch lines can also be connected by the connection lines 71; this way, two non-adjacent touch electrode columns 10 are controlled by the same switch lines.

In one embodiment, the multiplexing circuit 30 shown in FIG. 8 can use the timing sequence of the switch signal in FIG. 6 to make two adjacent touch electrode columns to operate in a time-sharing manner.

It should be noted that the time-sharing operation of two touch electrode columns 10 means that when one touch electrode column 10 is operating or receiving touch sensing signals, the other adjacent touch electrode column 10 is not operating or not receiving touch sensing signals. However, simultaneous operation of the two touch electrode columns 10 means that when one touch electrode column 10 is working or receiving touch sensing signals, the other touch electrode column 10 is also working or receiving touch sensing signals.

Since the two adjacent touch electrode columns 10 operate in the time-sharing manner, the present application reduces the difficulty of the touch integrated circuit 40 in recognizing a touch position, and at the same time improves accuracy of the touch position recognition.

In one embodiment, the same touch output channel group can be connected to at least two touch driving line groups 60; however, the present application is not limited in this regard. Furthermore, the same touch output channel group can also be connected to at least two non-adjacent touch driving line groups 60.

Figure 9:
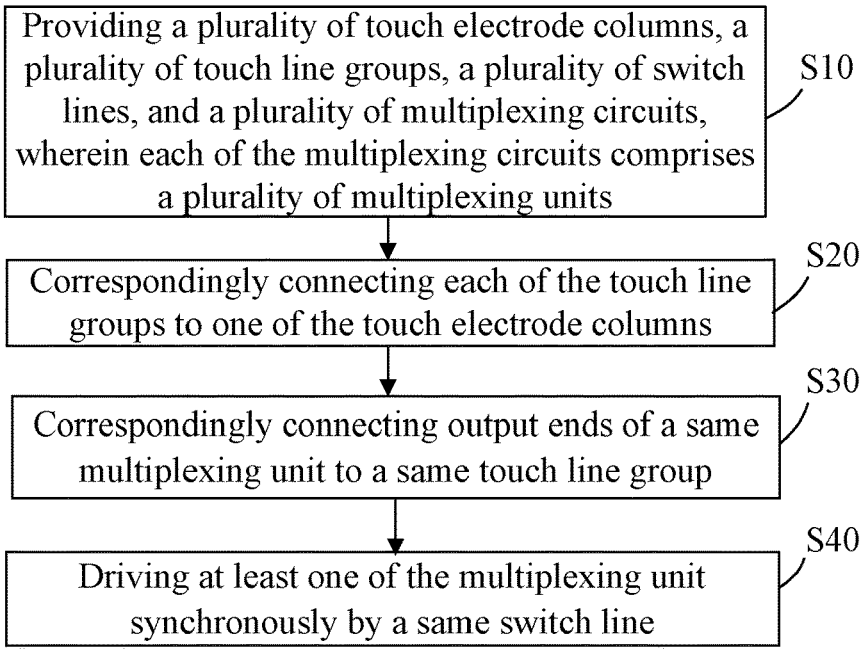
FIG. 9 is a process flow diagram illustrating a driving method of the touch panel according to one embodiment of the present application.

As shown in FIG. 9, in one embodiment, the present application provides a driving method of a touch panel, which comprises the following steps:

step S10: Providing a plurality of touch electrode columns, a plurality of touch line groups, a plurality of switch lines, and a plurality of multiplexing circuits, wherein each of the multiplexing circuits comprises a plurality of multiplexing units.

step S20: Correspondingly connecting each of the touch line groups to one of the touch electrode columns Step S30: Correspondingly connecting output ends of a same multiplexing unit to a same touch line group.

step S40: Driving at least one of the multiplexing units synchronously by a same switch line.

According to the driving method provided in the present embodiment, the same touch electrode column 10 of the present application can operate in a synchronous driving mode by using the same multiplexing unit 31 to synchronously turn on or turn off. The touch line group and the corresponding touch electrode column 10 have the same driving signal, thus reducing or eliminating not only a parasitic capacitance between the touch line and the touch electrode connected to the touch electrode but also parasitic capacitances between the touch line and other touch electrodes in the same column. Accordingly, the present application reduces power consumption for a touch function, and avoids failures in driving the touch function.

In one embodiment, the present application provides a display device comprising the touch panel in any of the above-mentioned embodiments. The display device can be any one of a liquid crystal display (LCD), a plasma display panel (PDP), an organic light emitting diode (OLED) display panel, or an active-matrix organic light-emitting diode (AMOLED) display panel. The display device can be used in at least one of the technical fields of vehicles, mobile phones, tablets, computers, and televisions.

In the display device, as shown in FIGS. 4 to 6, same-column driving is realized through Mux structures (multiplexing circuits), and touch electrodes in the same column and touch lines in the same column have the same driving signal, thereby greatly reducing parasitic capacitances between the touch electrodes and the touch lines, thus improving a touch performance problem caused by an overly high capacitive reactance at a far end of the touch line, and enhancing product competitiveness on the market.

Specifically, the display device can comprise the touch panel to realize touch operations by using touch input devices including a finger.

The touch panel can comprise touch electrodes, a touch integrated circuit, touch lines, and multiplexing circuits.

The touch electrodes are arranged in a matrix form, and are uniformly arranged in row and column directions. M and N respectively represent the number of the touch electrodes in a row direction and the number of the touch electrodes in a column direction (M and N are both positive integers, and in FIG. 4, M=4, N=5).

The touch integrated circuit is disposed at one end of the display device and can realize a touch driving function.

The touch lines are used to connect the touch electrodes and the touch integrated circuit, and the number of the touch lines can be equal to, but not limited to, the number of the touch electrodes.

The Mux structures are disposed between the touch lines and the touch integrated circuit. The Mux structure receive corresponding switch signal and touch driving signals. The touch lines are used to connect different in-plane touch electrodes to the touch integrated circuit, and the touch integrated circuit is a channel for supplying the touch driving signals.

The number of switch signals (e.g., T1 and T2; the Mux structure on the right also comprises two switch signals, wherein a switch adopts a PMOS design, which means the switch is turned on at low voltage) is equal to the number of the touch electrodes in the row direction, and the number of the touch driving signals (e.g., S1 to S5) is equal to the number of the touch electrodes in the column direction.

Turning on and off the touch lines in the same column is controlled by the same switch signal, while turning on and off the touch lines in different columns is controlled by different switch signals. As shown in FIG. 6, the switch signals are T1 and T2 respectively, wherein T1 and T2 control the first column and the second column, respectively.

The switch signals (e.g., T1 and T2) corresponding to different columns are controlled by a timing sequence. Whether in a touch driving stage or a sensing stage, both T1 and T2 can be turned on at different times.

The Mux structure design can ensure that the same column is in a synchronous driving mode (that is, the touch electrodes in the same column have the same driving signal in a same point of the touch driving stage). According to the working principles of a capacitor, a capacitance between two conductive plates having the same signal is the smallest, so it can be known that capacitances between the touch electrodes and the touch lines in the same column are basically negligible.

FIGS. 7 and 8 are schematic views showing an optimized design of the Mux structure. By means of a connection portion, the Mux structures on the right and on the left control turning on and turning off at the same time, which can reduce the number of switch signal lines.

The present embodiment provides a new Mux structure design for touch panels. The Mux structure realizes same-column driving. The touch electrodes and the touch lines in the same column have the same driving signal, which can greatly reduce parasitic capacitances between the touch electrodes and the touch lines, thus improving a touch performance problem caused by an overly high capacitive reactance at a far end of the touch line, and enhancing product competitiveness on the market.

Specifically, the same-column driving is realized through the Mux structure, and the touch electrodes and the touch lines in the same column have the same driving signal, which can greatly reduce the parasitic capacitances between the touch electrodes and the touch lines, thereby improving the touch performance problem caused by the overly high capacitive reactance at a far end of the touch line.

The synchronous driving of the Mux structure can reduce the number of the touch lines and thereby simplify a design of the touch integrated circuit.

It should be noted that equivalent replacements or changes can be made by those of ordinary skill in the art according to the technical solution of the present application and its inventive concept, and all these changes or replacements shall fall within the protection scope of the appended claims of the present application.

What is claimed is:

1. A touch panel, comprising:
   a plurality of touch electrode columns, wherein each of the touch electrode columns comprises a plurality of touch electrodes arranged along a first direction;
   a plurality of touch line groups, wherein each of the touch line groups comprises a plurality of touch lines, and the plurality of touch lines of a same touch line group are electrically connected to the plurality of touch electrodes in a same touch electrode column; and a plurality of multiplexing circuits, wherein each of the multiplexing circuits comprises a plurality of multiplexing units, output ends of a same multiplexing unit are correspondingly connected to the plurality of touch lines in the same touch line group, and a plurality of output channels of the same multiplexing unit are turned on or turned off synchronously, wherein when the output channels of the same multiplexing unit are turned on, the output channels of this multiplexing unit send a same driving signal to the touch electrodes and the touch signal lines in a same one column.

2. The touch panel according to claim 1, wherein each of the plurality of multiplexing circuits comprises a control sub-circuit, and the control sub-circuit is electrically connected to the plurality of multiplexing units to control two adjacent ones of the touch electrode columns to operate in a time-sharing manner.

3. The touch panel according to claim 2, wherein the plurality of touch electrode columns are sequentially arranged along a second direction, and the second direction is different from the first direction; the i-th touch electrode column operates simultaneously with the (i+2)-th touch electrode column, and/or the (i+1)-th touch electrode column operates simultaneously with the (i+3)-th touch electrode column; and wherein i is a positive integer.

4. The touch panel according to claim 2, wherein a number of the plurality of touch electrodes in the same touch electrode column is equal to a number of the plurality of touch lines in the same touch line group, and each of the plurality of touch electrodes is connected to one of the plurality of touch lines.

5. The touch panel according to claim 4, wherein the touch panel further comprises a touch integrated circuit; each of the plurality of multiplexing units comprises at least two thin film transistors; and two output pins of the touch integrated circuit are respectively electrically connected to input ends of two of the thin film transistors; a same control signal output by the control sub-circuit is electrically connected to control ends of the two thin film transistors; output ends of the two thin film transistors are respectively electrically connected to different touch electrodes in the same touch electrode column; a number of the thin film transistors in the same multiplexing unit is equal to the number of the plurality of touch lines in the same touch line group; and the output end of each of the thin film transistors is connected to one of the touch lines.

6. The touch panel according to claim 4, wherein the touch panel further comprises a plurality of touch driving line groups; a number of touch driving lines in a same touch driving line group is equal to a number of thin film transistors in the same multiplexing unit; and each of the touch driving lines is connected to an input end of one of the thin film transistors.

7. The touch panel according to claim 6, wherein the touch integrated circuit comprises a plurality of touch output channel groups; a number of touch output channels in a same touch output channel group is equal to the number of the touch driving lines in the same touch driving line group; and each of the touch output channels is connected to one of the touch driving lines.

8. The touch panel according to claim 7, wherein each of the touch output channel groups is simultaneously connected to multiple ones of the touch driving line groups that are not adjacent to each other.

9. The touch panel according to claim 2, wherein each of the control sub-circuits comprises a switch line; the touch panel further comprises a connection portion arranged between two adjacent ones of the multiplexing circuits; and the switch line in one of the multiplexing circuits is electrically connected to the switch line in another one of the multiplexing circuits through the connection portion.

10. The touch panel according to claim 9, wherein the connection portion comprises at least one connection line; and the switch lines of two different ones of the multiplexing circuits are connected by a same connection line to synchronously drive at least two of the touch electrode columns connected to the two different multiplexing circuits.

11. A display device, comprising:
a plurality of touch electrode columns, wherein each of the touch electrode columns comprises a plurality of touch electrodes arranged along a first direction;
a plurality of touch line groups, wherein each of the touch line groups comprises a plurality of touch lines, and the plurality of touch lines of the same touch line group are electrically connected to the plurality of touch electrodes in the same touch electrode column;
a plurality of multiplexing circuits, wherein each of the multiplexing circuits comprises a plurality of multiplexing units, output ends of a same multiplexing unit are correspondingly connected to the plurality of touch lines in the same touch line group, and a plurality of output channels of the same multiplexing unit are turned on or turned off synchronously, wherein when the output channels of the same multiplexing unit are turned on, the output channels of this multiplexing unit send a same driving signal to the touch electrodes and the touch signal lines in a same one column; and
a touch integrated circuit, wherein the touch integrated circuit comprises a plurality of touch output channel groups, and each of the touch output channel groups is electrically connected to input ends of at least two of the multiplexing units.

12. The display device according to claim 11, wherein each of the plurality of multiplexing circuits comprises a control sub-circuit, and the control sub-circuit is electrically connected to the plurality of multiplexing units to control two adjacent ones of the touch electrode columns to operate in a time-sharing manner.

13. The display device according to claim 12, wherein the plurality of touch electrode columns are sequentially arranged along a second direction, and the second direction is different from the first direction; the i-th touch electrode column operates simultaneously with the (i+2)-th touch electrode column, and/or the (i+1)-th touch electrode column operates simultaneously with the (i+3)-th touch electrode column; and wherein i is a positive integer.

14. The display device according to claim 12, wherein a number of the plurality of touch electrodes in the same touch electrode column is equal to a number of the plurality of touch lines in the same touch line group; and each of the plurality of touch electrodes is connected to one of the plurality of touch lines.

15. The display device according to claim 14, wherein each of the plurality of multiplexing units comprises at least two thin film transistors; and two output pins of the touch integrated circuit are respectively electrically connected to input ends of two of the thin film transistors; a same control signal output by the control sub-circuit is electrically connected to control ends of the two thin film transistors; output ends of the two thin film transistors are respectively electrically connected to different touch electrodes in the same touch electrode column; a number of the thin film transistors in the same multiplexing unit is equal to the number of the plurality of touch lines in the same touch line group; and the output end of each of the thin film transistors is connected to one of the touch lines.

16. The display device according to claim 14, wherein the display device further comprises a plurality of touch driving line groups; a number of touch driving lines in a same touch driving line group is equal to a number of thin film transistors in the same multiplexing unit; and each of the touch driving lines is connected to an input end of one of the thin film transistors.

17. The display device according to claim 16, wherein a number of touch output channels in a same touch output channel group is equal to the number of the touch driving lines in the same touch driving line group; and each of the touch output channels is connected to one of the touch driving lines.

18. The display device according to claim 17, wherein each of the touch output channel groups is simultaneously connected to multiple ones of the touch driving line groups that are not adjacent to each other.

19. The display device according to claim 12, wherein each of the control sub-circuits comprises a switch line; the display device further comprises a connection portion arranged between two adjacent ones of the multiplexing circuits; and the switch line in one of the multiplexing circuits is electrically connected to the switch line in another one of the multiplexing circuits through the connection portion.

20. The display device according to claim 19, wherein the connection portion comprises at least one connection line; the switch lines of two different ones of the multiplexing circuits are connected by a same connection line to synchronously drive at least two of the touch electrode columns connected to the two different multiplexing circuits.

* * * * *